(12) United States Patent
Mayville et al.

(10) Patent No.: US 6,634,252 B2
(45) Date of Patent: Oct. 21, 2003

(54) SUPPORT FOR MOTION TRANSMITTING CABLE ASSEMBLY

(75) Inventors: Brian Andrew Mayville, South Lyon, MI (US); Vanky Cheung, Toronto (CA); Matthew R. Zolan, Shelby Township, MI (US)

(73) Assignee: Teleflex Incorporated, Plymouth Meeting, PA (US)

(*) Notice: Subject to any disclaimer, the term of this patent is extended or adjusted under 35 U.S.C. 154(b) by 22 days.

(21) Appl. No.: 09/881,324

(22) Filed: Jun. 14, 2001

(65) Prior Publication Data

US 2002/0189390 A1 Dec. 19, 2002

(51) Int. Cl.$^7$ .................................................. F16C 1/10
(52) U.S. Cl. ..................... 74/502.6; 74/502.4; 74/500.5
(58) Field of Search ............................. 74/502.6, 502.4, 74/500.5

(56) References Cited

U.S. PATENT DOCUMENTS

| | | |
|---|---|---|
| 2,543,997 A | 3/1951 | Vavra et al. |
| 2,744,769 A | 5/1956 | Roeder et al. |
| 3,163,712 A | 12/1964 | Cochran |
| 3,205,727 A | 9/1965 | Sevrence |
| 3,229,026 A | 1/1966 | Sulzer |
| 3,366,356 A | 1/1968 | fisher |
| 3,432,129 A | 3/1969 | Santucci |
| 3,631,738 A | 1/1972 | Harper |
| 3,944,177 A | 3/1976 | Yoda |
| 3,954,238 A | 5/1976 | Nivet |
| 4,061,299 A | 12/1977 | Kurosaki |
| 4,177,691 A | 12/1979 | Fillmore |
| 4,339,213 A | 7/1982 | Gilmore |
| 4,346,863 A | 8/1982 | Zeiträger et al. |
| 4,348,348 A * | 9/1982 | Bennett et al. ............ 264/255 |
| 4,407,042 A | 10/1983 | Schramme et al. |
| 4,458,552 A | 7/1984 | Spease et al. |
| 4,601,448 A | 7/1986 | Miyazaki et al. |
| 4,614,321 A | 9/1986 | Andre |
| 4,626,620 A * | 12/1986 | Plyler .................... 174/153 G |
| 4,642,859 A | 2/1987 | Kaiser |
| 4,763,541 A | 8/1988 | Spease |
| 4,889,006 A | 12/1989 | Kolinske et al. |
| 4,951,524 A | 8/1990 | Niskanen |
| 5,046,380 A | 9/1991 | Matsumoto et al. |
| 5,086,662 A | 2/1992 | Tayon et al. |
| 5,105,682 A | 4/1992 | Jung |
| 5,142,933 A * | 9/1992 | Kelley .................... 192/111 A |
| 5,347,882 A * | 9/1994 | Klotz ........................ 74/502.4 |
| 5,414,218 A | 5/1995 | Nathan |

(List continued on next page.)

FOREIGN PATENT DOCUMENTS

| | | | |
|---|---|---|---|
| AT | 0365243 | | 4/1990 |
| DE | 2439404 | | 2/1976 |
| DE | 1981343 | | 7/1999 |
| EP | 0223470 | | 5/1987 |
| EP | 0239984 | | 10/1987 |
| EP | 1041296 | | 10/2000 |
| FR | 2756879 | | 6/1998 |
| FR | 2781262 | | 1/2000 |
| FR | 2791742 | | 10/2000 |
| GB | 2 275 316 | * | 8/1994 |
| WO | WO 9304488 | | 3/1993 |

*Primary Examiner*—David A. Bucci
*Assistant Examiner*—Julie K. Smith
(74) *Attorney, Agent, or Firm*—Howard & Howard

(57) ABSTRACT

A retainer (22) is supported on a body (12) and includes a pair of tabs (24) for engaging a pair of recesses (26) in the edges (18) of the slot to retain the body (12) in a slot. The assembly (10) is characterized by the retainer (22) being disposed axially adjacent the slot groove (16) with the tabs (24) extending axially over the slot groove (16). The body (12) and the ring (34) present a rib (32) and a shoulder (40) extending annularly about the interior surface (36) of the ring (34) for retaining the retainer (22) in the retainer groove (28) on the body (12).

14 Claims, 3 Drawing Sheets

U.S. PATENT DOCUMENTS

| | | | |
|---|---|---|---|
| 5,448,926 A | * 9/1995 | Reasoner | 74/500.5 |
| 5,531,134 A | * 7/1996 | Petruccello | 74/502.4 |
| 5,570,611 A | * 11/1996 | Pospisil et al. | 74/502.6 |
| 5,579,662 A | * 12/1996 | Reasoner | 74/502.4 |
| 5,685,199 A | * 11/1997 | Malone | 403/374.1 |
| 5,865,066 A | 2/1999 | Osborn et al. | |
| 5,884,531 A | * 3/1999 | Koenig | 74/500.5 |
| 5,911,790 A | * 6/1999 | Bates et al. | 248/56 |
| 6,019,348 A | * 2/2000 | Powell | 141/198 |
| 6,023,993 A | * 2/2000 | Beugelsdyk et al. | 248/73 |
| 6,119,543 A | * 9/2000 | Webb | 285/261 |
| 6,164,986 A | * 12/2000 | Frantz et al. | 439/610 |
| 6,178,844 B1 | 1/2001 | Bürger | |

* cited by examiner

SUPPORT FOR MOTION TRANSMITTING CABLE ASSEMBLY

BACKGROUND OF THE INVENTION

1. Field of the Invention

A support for a motion transmitting remote control assembly of the type for transmitting motion in a curved path by a motion transmitting core element.

2. Description of the Prior Art

The motion transmitting or cable assemblies to which the instant invention pertains typically comprise a conduit supporting a flexible motion transmitting core element. It is common to support such assemblies in a bracket in an automotive vehicle, or the like. This support is accomplished by a support body defining an axial opening disposed internally for supporting a control assembly and a slot groove disposed externally for receiving the edges of a slot in the bracket. In addition, it is normally a requirement that the body be retained in the slot other than by friction. Accordingly, such support bodies have included a retainer supported on the body and including a pair of tabs for engaging a pair of recesses in the edges of the slot to retain the body in the slot.

In one such prior art assembly disclosed in U.S. Pat. No. 5,347,882 to Klotz, the tabs are defined by a snap ring disposed in the groove and retained therein by the surrounding edges of the slot in the bracket. In yet another prior art assembly disclosed in European Patent Publication 0365243 to Babcock Industries, the tabs are integral with the body.

SUMMARY OF THE INVENTION AND ADVANTAGES

The subject invention provides an improved support for a motion transmitting remote control assembly.

The invention includes a support body defining an axial opening disposed internally for supporting a control assembly and a slot groove disposed externally for receiving the edges of a slot in a bracket. A retainer is supported on the body and includes a pair of tabs for engaging a pair of recesses in the edges of the slot to retain the body in the slot. The assembly is characterized by the body (12) defining a retainer groove (28) disposed externally and axially from said slot groove (16) for retaining said retainer (22) on said body (12) with the retainer being disposed axially adjacent the slot groove with the tabs extending axially over the slot groove.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 2:
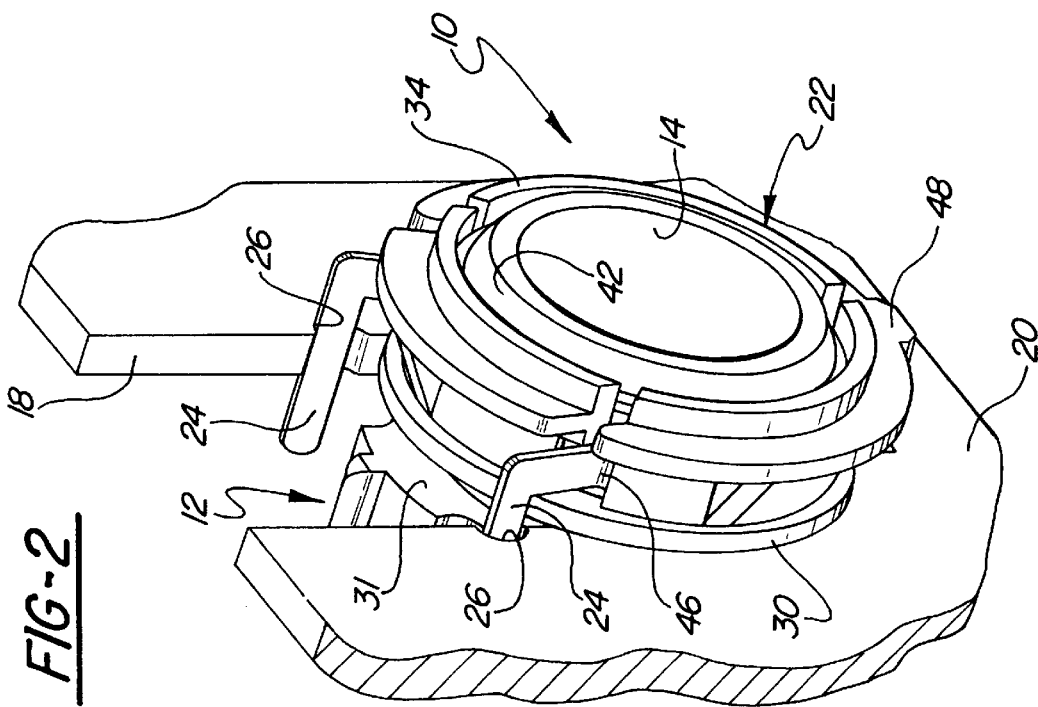
FIG. 2 is a perspective view like FIG. 1 but shown from the opposite side of the bracket.
Figure 1:
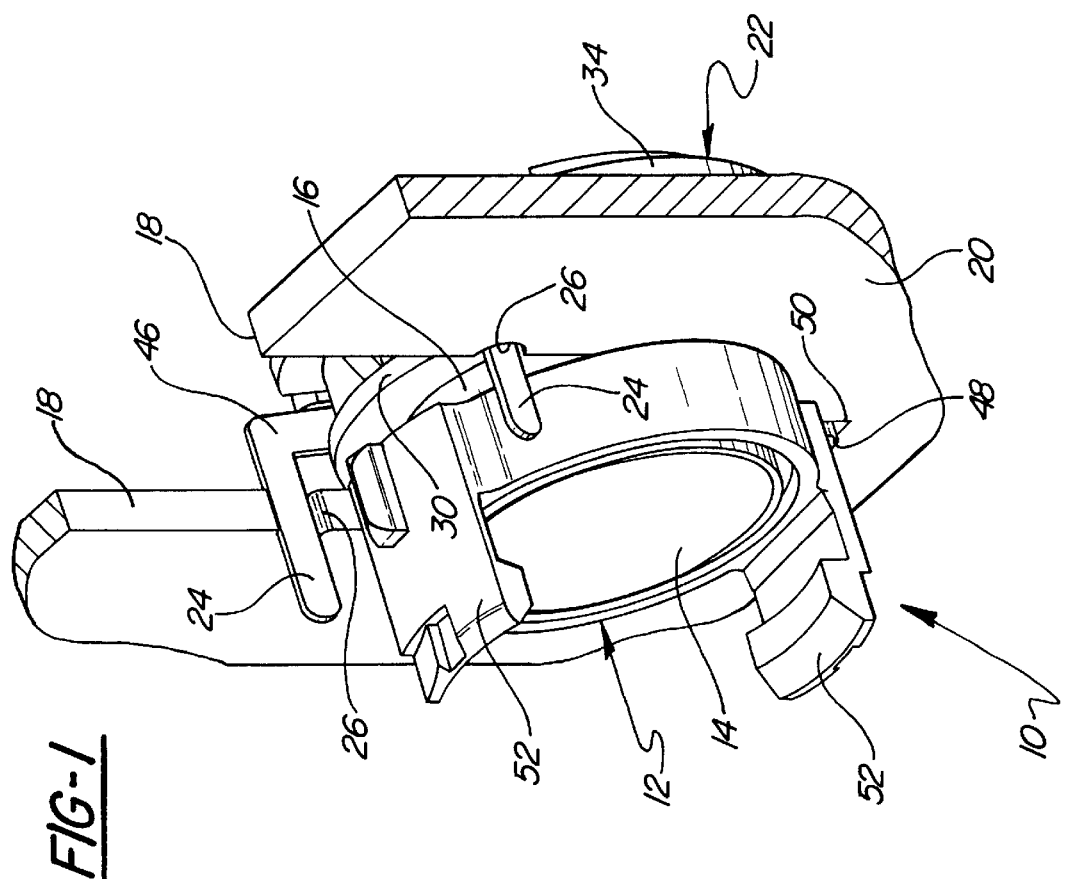
FIG. 1 is a perspective view of the invention installed in a slot in a bracket.
Figure 4:
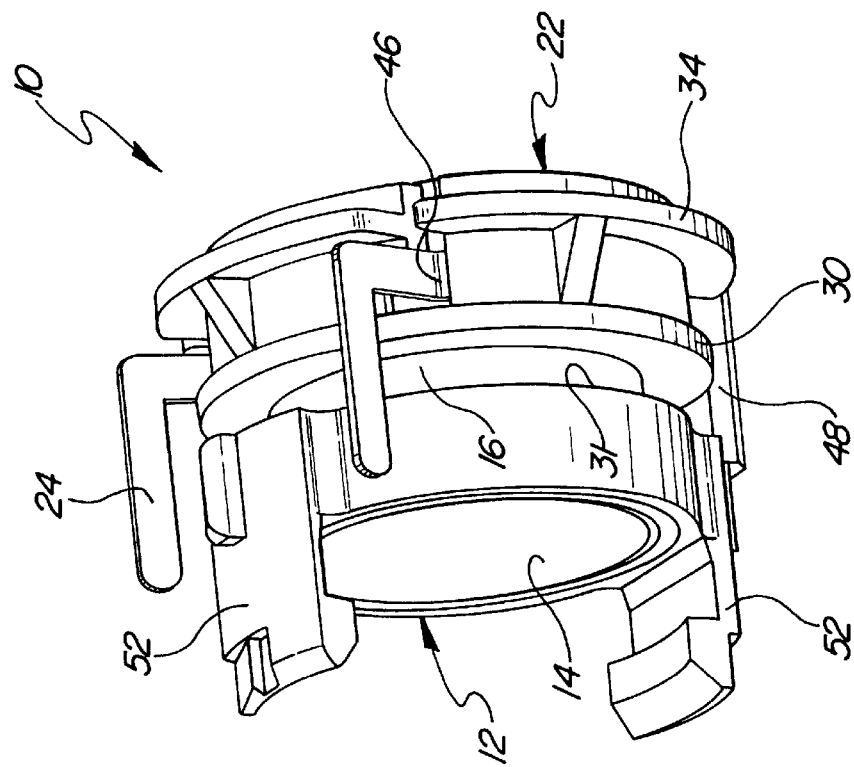
FIG. 4 is a perspective view like FIG. 1 but without the bracket.
Figure 3:
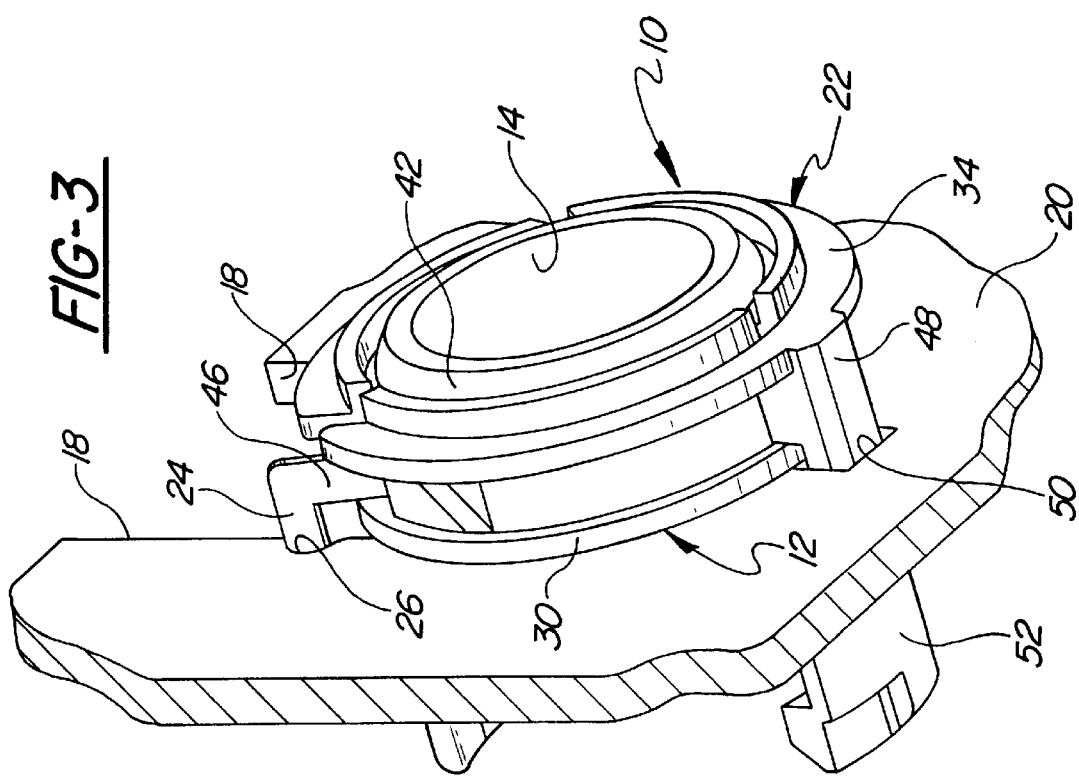
FIG. 3 is a perspective view like FIG. 2 but shown from the underside of the bracket.

Referring to the Figures, wherein like numerals indicate like or corresponding parts throughout the several views, a support for a motion transmitting remote control assembly is generally shown at 10.

The assembly 10 includes a support body, generally indicated at 12, consisting of organic polymeric material and defining an axial opening 14 disposed internally for supporting a control assembly. The control assembly typically supported in the opening 14 includes a conduit supporting a motion transmitting core element, the conduit being supported in the opening 14. The support body 12 also includes a slot groove 16 disposed externally for receiving the edges 18 of a slot in a bracket 20.

A retainer, generally indicated at 22, is supported on the body 12 and includes a pair of tabs 24 for engaging a pair of recesses 26 in the edges 18 of the slot to retain the body 12 in the slot.

The assembly 10 is characterized by the retainer 22 being disposed axially adjacent the slot groove 16 with the tabs 24 extending axially over the slot groove 16. To this end, the body 12 defines a retainer groove 28 (FIGS. 5 & 6) disposed externally and axially from the slot groove 16 for retaining the retainer 22 on the body 12. A radial flange 30 extends anularly about the body 12 and is axially disposed between the slot groove 16 and the retainer groove 28. The retainer groove 28 is defined by and extends between the flange 30 and a rib 32 (FIGS. 5 & 6) extending anularly about the body 12. In a like manner, the slot groove 16 is defined by and extends between the flange 30 and a shoulder 31 extending annularly about the body 12 for sandwiching the edge 18 of the slot in the bracket 20 between the flange 30 and the shoulder 31.

Figure 5:
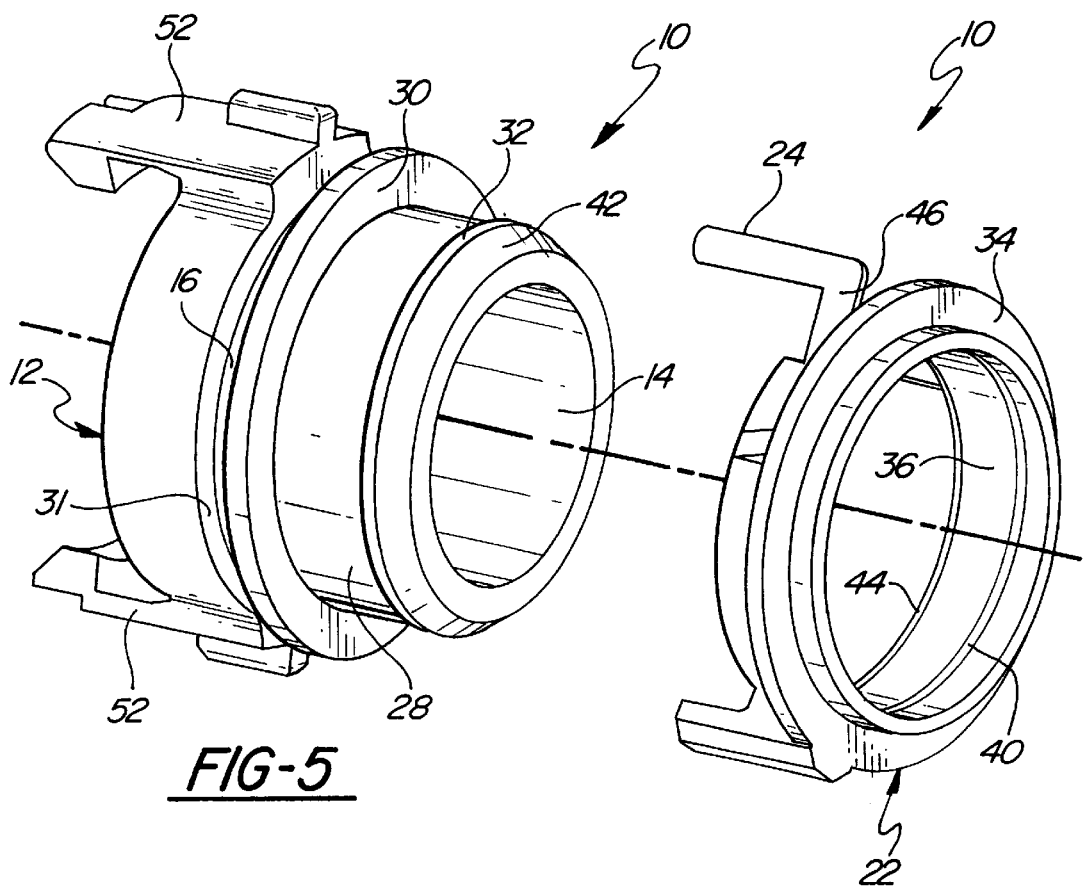
FIG. 5 is a perspective exploded view of the components before assembly.
Figure 6:
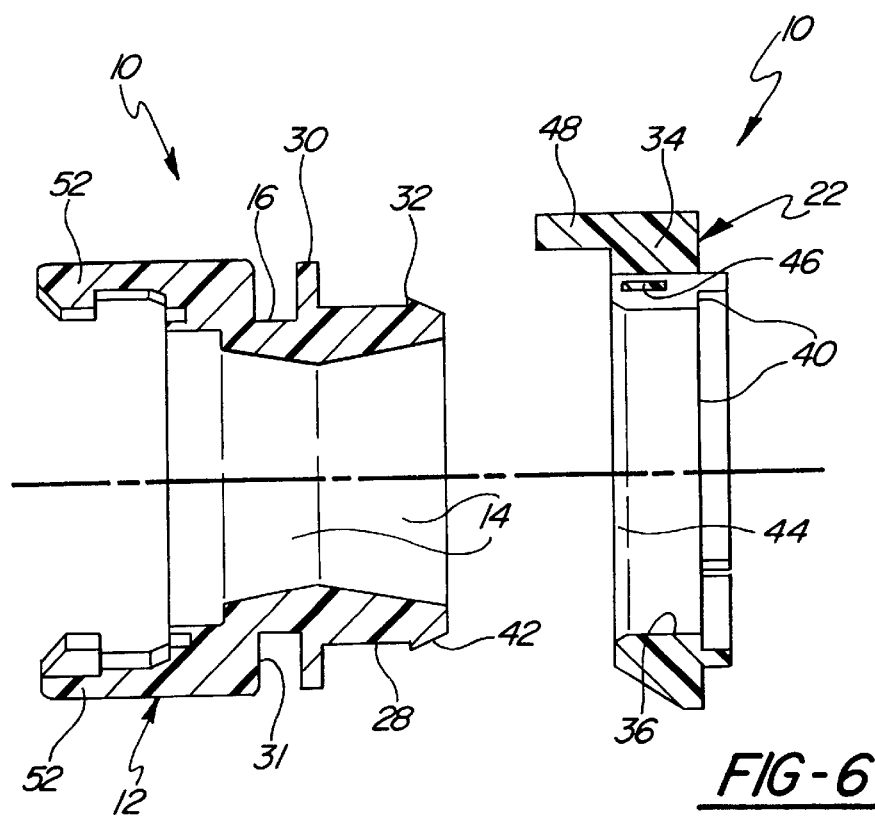
FIG. 6 is a cross sectional view of the components of FIG. 5.

The retainer 22 includes an annular ring 34 made of organic polymeric material and having an interior surface 36 disposed in the retainer groove 28 with the ring 34 in abutting relationship with the flange 30. The body 12 and the ring 34 present radially overlapping abutments for retaining the retainer 22 in the retainer groove 28 on the body 12. These abutments comprise the rib 32 extending annularly about the body 12 and disposed axially from the flange 30 and a shoulder 40 extending annularly about the interior surface 36 of the ring 34. As best shown in FIGS. 5 & 6, the rib 32 defines a conical ramp 42 which engages a female conical surface 44 leading into the interior surface 36 of the ring 34 to facilitate disposition of the ring 34 into the retainer groove 28 in the body 12. The ring 34 is flexible enough to be snapped onto the body 12 and, once snapped into position, the ring 34 is freely rotatable in the retainer groove 28.

The retainer 22 also includes a metal clip 46 supported by the ring 34 and defining the tabs 24. as stated above, the ring 34 consists of an organic polymeric material and is overmolded about the clip 46 to surround and retain the clip 46 with the tabs 24 extending from the ring 34 and overlying the flange 30.

The ring 34 includes a radial projection 48 for engaging a notch 50 in the slot to prevent rotation of the ring 34 in the slot while retained therein. However, the body 12 remains rotatable while supported in the bracket 20.

The body 12 includes a connector defined by the fingers 52 for connection to a control assembly, such as a fitting or ferrule on a conduit.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A support for a motion transmitting remote control assembly comprising;

a support body (12) defining an axial opening (14) disposed internally for supporting a control assembly and a slot groove (16) disposed externally for receiving the edges (18) of a slot in a bracket (20) and, a retainer (22) supported on said body (12) and characterized by including an annular ring (34) supporting a pair of tabs (24) for engaging a pair of recesses (26) in the edges (18) of the slot to retain said body (12) in the slot, said annular ring (34) being endless to extend completely about said body (12).

2. An assembly as set forth in claim 1 wherein said body (12) defines a retainer groove (28) disposed externally and axially from slot groove (16) for retaining said annular ring (34) on said body (12) with said annular ring (34) being endless to extend completely around said groove (28) and disposed axially adjacent said slot groove (16) with said tabs (24) extending axially over said slot groove (16), and said body (12) includes a radial flange (30) extending annularly about said body (12) and axially disposed between said slot groove (16) and said retainer groove (28).

3. An assembly as set forth in claim 2 wherein said annular ring (34) includes an interior surface (36) disposed in and completely about said retainer groove (28) with said ring (34) in abutting relationship with said flange (30).

4. An assembly as set forth in claim 3 wherein said body (12) and said ring (34) present radially overlapping abutments for retaining said retainer (22) in said retainer groove (28) on said body (12).

5. An assembly as set forth in claim 4 wherein said abutments comprise a rib (32) extending annularly about said body (12) and disposed axially from said flange (30) to define said retainer groove (28) and a shoulder (40) extending annularly about said interior surface (36) of said ring (34).

6. An assembly as set forth in claim 5 wherein said retainer (22) includes a metal clip (46) supported by said ring (34) and defining said tabs (24).

7. An assembly as set forth in claim 6 wherein said ring (34) consists of an organic polymeric material overmolded about said clip 46 to surround and retain said clip 46 with said tabs (24) extending from said ring (34) and overlying said flange (30).

8. An assembly as set forth in claim 7 wherein said ring (34) is freely rotatable in said retainer groove (28).

9. An assembly as set forth in claim 8 wherein said ring (34) includes a radial projection (48) for engaging a notch (50) in the slot to prevent rotation of the ring (34) in the slot while retained therein.

10. An assembly as set forth in claim 9 wherein said body (12) includes a connector (52) for connection to a control assembly.

11. An assembly as set forth in claim 10 wherein said body (12) consists of organic polymeric material.

12. An assembly as set forth in claim 1 wherein annular ring (34) is snapped onto said body (12) for rotation relative thereto.

13. An assembly as set forth in claim 12 wherein said retainer (22) includes a metal clip (46) supported by said ring (34) and defining said tabs (24).

14. An assembly as set forth in claim 13 wherein said ring (34) consists of an organic polymeric material overmolded about said clip (46) to surround and retain said clip (46) with said tabs (24) extending from said ring (34) and overlying said slot groove (16).

* * * * *